United States Patent Office 3,184,477
Patented May 18, 1965

3,184,477
PROCESS FOR PREPARING INNER
SULFONIUM SALTS
William Baird, John Woolley Batty, and Alexander Parkinson, Manchester, England, assignors to Imperial Chemical Industries Limited, London, England, a corporation of Great Britain
No Drawing. Filed Dec. 31, 1962, Ser. No. 248,233
Claims priority, application Great Britain, Jan. 15, 1962, 1,355/62
12 Claims. (Cl. 260—327)

This invention relates to the manufacture of sulphonium salts.

We have previously described a process for the preparation of β-hydroxyalkyl sulphonium salts whereby an organic sulphide is reacted with an alkylene oxide in the presence of an aqueous acid. We have now found that sulphonium salts may be advantageously prepared by reacting an organic sulphide with an alkylene oxide in the presence of an acid anhydride or an acid halide.

Thus according to the present invention we provide a process for the manufacture of sulphonium salts or sulphonium inner salts which comprises reacting an organic sulphide $R_3$—S—$R_4$ with an alkylene oxide and an acid anhydride or an acid halide where $R_3$ and $R_4$ are the group ($CHR_1$—$CHR_2OH$), or straight or branched chain substituted or unsubstituted alkyl, or substituted or unsubstituted alkenyl containing from 2–3 carbon atoms, aryl, aralkyl, alicyclic or heterocyclic groups as hereinafter defined the same or different, and $R_1$ and $R_2$ are hydrogen or lower alkyl, the same or different, the lower alkyl group containing from 1 to 3 carbon atoms.

The straight or branched chain alkyl groups from which $R_3$ and $R_4$ may be selected may contain up to 22 carbon atoms but it is preferred that they contain from 1 to 18 carbon atoms. By a substituted alkyl group we mean a straight or branched chain alkyl group which may contain up to 22 carbon atoms and contain as substituents for example hydroxyl, carboxyl, ether, ester, mercapto, thioether, keto, cyano, sulphonic acid or sulphuric ester groups.

By alkenyl groups containing 2–3 carbon atoms, we mean aliphatic hydrocarbon groups which contain one double bond for example vinyl, methylvinyl or allyl groups. By aryl groups we mean those groups which are derived from a member of the benzene or naphthalene series, for example phenyl or naphthyl groups. By aralkyl groups we mean alkyl groups which are themselves substituted by an aryl group for example the benzyl group. By alicyclic groups we mean groups which contain a non benzenoid cyclic carbon ring, for example the cyclohexyl group. By heterocyclic groups we mean groups which contain a closed ring system of atoms containing at least one atom of an element other than carbon, e.g., oxygen, sulphur, nitrogen, for example the pyridyl or quinolyl groups. Any of the aforementioned groups may contain as substituents for example hydroxyl, carboxyl, ether, ester, mercapto, thioether, keto, cyano, sulphonic acid or sulphuric ester groups.

The reaction may be carried out in the presence or absence of an inert diluent or solvent or it may be convenient to employ an excess of one of the reagents as a solvent. Particularly suitable inert diluents or solvents include for example, methyl chloroform, tetrachlorethane, carbon tetrachloride, perchlorethylene or trichlorofluoroethane.

The reaction may be carried out at a temperature between 50° C. and —50° C. and it is particularly preferred to carry out the reaction at temperatures between 5° C. and —15° C.

Organic sulphides which are suitable in the present invention include, for example, dimethyl sulphide, methylethyl sulphide, dioctadecyl sulphide, (β-hydroxy-ethyl)sulphide, benzyl sulphide, methyl vinyl sulphide, bis(β-hydroxyethyl)sulphide, bis(2-hydroxypropylsulphide), methyl phenyl sulphide and suitable alkylene oxides include for example, ethylene, propylene and butylene oxides.

Suitable acid anhydrides which may be used in the present invention include for example carbon dioxide, sulphur dioxide, sulphur trioxide, acetic anhydride, propionic anhydride, maleic anhydride and succinic anhydride. We, particularly prefer to use sulphur dioxide.

Suitable acid halides include, for example, acetyl chloride, propionyl chloride or acetyl bromide.

As an illustration of the use of an acid anhydride in the present process, when sulphur dioxide for example is reacted with ethylene oxide and thiodiglycol at low temperatures, optionally in the presence of an inert diluent or solvent, a bis(β-hydroxyethyl) β-sulphitoethyl sulphonium inner salt is obtained. This may be readily converted to a tris(β-hydroxyethyl) sulphonium salt, for example the chloride, by treating with, for example, hydrochloric acid. Again, as a further example, when acetic anhydride is reacted with ethylene oxide and thiodiglycol at low temperatures, optionally in the presence of an inert diluent or solvent, a product is obtained which may be converted to tris-(β-hydroxyethyl)sulphonium chloride by treatment with hydrochloric acid.

When an acid chloride, for example acetyl chloride, is used in the process of the present invention the resulting sulphonium salt may be isolated as the chloride.

The products of the present invention are of industrial interest, for example as intermediates for textile auxiliaries, and as bactericides.

The invention is illustrated but not limited by the following examples in which parts and percentages are by weight.

*Example 1*

61 parts of thiodiglycol are added slowly with stirring at —10° to —15° C. to a mixture of 23 parts of ethylene oxide and 33.5 parts of sulphur dioxide. The temperature is allowed to rise to 20–23° C. during 2 hours and maintained at this temperature for a further 4 hours. Excess ethylene oxide and sulphur dioxide are removed by heating to 30–35° C. under reduced pressure.

There is obtained 115 parts of a pale yellow syrup containing 87% w./w. of bis(β-hydroxyethyl) β-sulphitoethyl sulphonium inner salt.

Tris (β-hydroxyethyl)sulphonium chloride M.P. 125° C. is readily obtained by treating the inner salt with hydrochloric acid.

*Example 2*

55 parts of thiodiglycol are added slowly with stirring at —5° to 0° C. to a mixture of 20 parts of ethylene oxide and 20.5 parts of sulphur dioxide in 100 parts of methyl chloroform. The mixture is stirred at 0° C. to 5° C. for 4 hours to complete reaction. The product is a suspension of bis(β-hydroxyethyl) β-sulphitoethyl sulphonium inner salt in methyl chloroform.

*Example 3*

22 parts of ethylene oxide are stirred at —10° C. whilst 51 parts acetic anhydride are added and 61 parts of thiodiglycol are then added to the mixture whilst maintaining the temperature at 0° to —5° C. The temperature is allowed to rise to 25–30° C. during 1 hour and maintained at this temperature, cooling as necessary, until reaction is complete.

The resulting product is a pale yellow syrup containing 46.8% w./w. of sulphonium salt assumed to be β-acetoxyethyl bis(β-hydroxyethyl)sulphonium acetate. Tris (β-hydroxyethyl)sulphonium chloride M.P. 125° C. is readily obtained from the product by treating with hydrochloric acid and removing water and acetic acid under reduced pressure.

*Example 4*

14.7 parts of ethylene oxide is passed into a stirred mixture of 102 parts of acetic anhydride and 40.7 parts of thiodiglycol at 35–40° C. When addition is complete the mixture is stirred for a further 1 hour. The product contains approximately 40% w./w. of acetyl derivatives of tris($\beta$-hydroxyethyl)sulphonium acetate.

*Example 5*

11 parts of ethylene oxide and 125 parts of methyl chloroform are stirred at −15° to −10° C. whilst 19.5 parts of acetyl chloride are slowly added. 31 parts of thiodiglycol are slowly added whilst maintaining the temperature below −10° C. and when the initial vigorous reaction is complete the temperature is allowed to rise to 0° C. and the product stirred for a further 1 hour. Tris($\beta$-hydroxyethyl)sulphonium chloride separates from the reaction mixture.

*Example 6*

206 parts of liquid sulphur dioxide are added to 366 parts of stirred thiodiglycol, during ½ hour, maintaining the reaction temperature at −10° C. to −15° C. 139 parts of ethylene oxide are then added to the stirred mixture during 1½ to 2 hours, maintaining the reaction mixture at −5° C. to −10° C. The ethylene oxide may be added as liquid, or passed in as gas. The mixture is then stirred at −5° C. to −10° C. for a further 1 hour and then the temperature is allowed to rise to 0° C. during 4 hours, and then to 20° C. during a further 4 hours using cooling as necessary.

There is obtained 711 parts of a pale yellow syrup containing 88–90% w./w. of bis($\beta$-hydroxyethyl)-$\beta$-sulphitoethyl-sulphonium inner salt and 1–2% free sulphur dioxide.

*Example 7*

40 parts sulphur trioxide are added slowly with stirring at −40° C. to a solution of 22 parts of ethylene oxide in 150 parts of carbon tetrachloride. The resulting suspension is stirred at −35° to −40° C. whilst 61 parts of thiodiglycol are slowly added. The temperature is allowed to rise to −10° C. during 1 hour and is maintained at −10° C. for a further 4 hours. Carbon tetrachloride and excess ethylene oxide are removed at 20–25° C. under reduced pressure. There is obtained 112 parts of a dark brown oily liquid containing 31% by weight of bis($\beta$-hydroxyethyl)-$\beta$-sulphatoethyl sulphonium inner salt.

Tris($\beta$-hydroxyethyl)sulphonium chloride M.P. 125° C. is readily obtained by treating the inner salt with boiling water, neutralising with barium hydroxide, filtering from precipitated barium sulphate, neutralising with hydochloric acid and evaporating to low bulk.

*Example 8*

A mixture of 61 parts of thiodiglycol and 22 parts of ethylene oxide is stirred at 0° C. and a rapid stream of carbon dioxide is passed through the mixture for 4 to 5 hours. Excess ethylene oxide is removed at 20–25° C. under reduced pressure. There is obtained 85 parts of a pale yellow syrupy product which contains 41% by weight of bis($\beta$-hydroxyethyl)$\beta$-carbonatoethyl sulphonium inner salt.

Tris($\beta$-hydroxyethyl)sulphonium chloride M.P. 125° C. is readily obtained by just acidifying the carbonate with dilute hydrochloric acid and evaporating to low bulk.

*Example 9*

25.6 parts of diallyl sulphide and 14.4 parts of sulphur dioxide are stirred at −10° C. to −15° C. and 13.0 parts of propylene oxide are slowly added. After stirring at −10° C. for a further 3 hours the mixture is allowed to warm at room temperature and all volatile starting materials removed at 25° C. under reduced pressure (15 mm.). There is obtained 35.6 parts of a viscous yellow oil containing 94.0% of ($\beta$-sulphitopropyl)bis-allyl sulphonium inner salt as determined by treating the product with dilute acid and determining the evolved sulphur dioxide.

*Example 10*

75 parts of bis($\beta$-hydroxypropyl)sulphide are added slowly with stirring at −10° C. to −15° C. to a mixture of 23 parts of ethylene oxide and 33.5 parts of sulphur dioxide. The temperature is allowed to rise slowly to 0–5° C. during 2 hours, maintained at 0–5° C. for a further 3 hours and then allowed to rise to 20–25° C. The product is a pale yellow syrup containing 86–88% of bis($\beta$-hydroxypropyl)-$\beta$-sulphitoethyl sulphonium inner salt and 1–2% uncombined sulphur dioxide.

*Example 11*

61 parts of thiodiglycol are added slowly at −15° to −20° C. to 33.5 parts of liquid sulphur dioxide with stirring. 23 parts of ethylene oxide are then added slowly maintaining the reaction temperature at −10° to −5° C. The temperature is allowed to rise slowly to 0–5° C. during 2 hours, maintained at 0–5° C. for a further 3 hours and then allowed to rise to 20–25° C. There is obtained a pale yellow syrup containing 89–91% of bis(hydroxyethyl)-$\beta$-sulphitoethylsulphonium inner salt and 1–2% uncombined sulphur dioxide.

*Example 12*

In place of the 23 parts of ethylene oxide used in Example 1 there may be used 30 parts of propylene oxide. The product is a pale yellow syrup containing 65–70% w./w. of bis($\beta$-hydroxyethyl)-$\beta$-sulphito propylsulphonium inner salt.

*Example 13*

In place of the 23 parts of ethylene oxide used in Example 7 there may be used 36 parts of propylene oxide. There is obtained a pale yellow syrup containing 60–65% of bis($\beta$-hydroxypropyl)-$\beta$-sulphitopropylsulphonium salt.

*Example 14*

In place of the 61 parts of thiodiglycol used in Example 8 there may be used 53 parts of ethyl-$\beta$-hydroxyethylsulphide. The product is a pale yellow syrup containing 85–90% w./w. of ethyl-$\beta$-hydroxyethyl-$\beta$-sulphitoethylsulphonium inner salt.

*Example 15*

In place of the 61 parts of thiodiglycol used in Example 3 there may be used 75 parts of bis($\beta$-hydroxypropyl)sulphide. There is obtained a product containing 45–50% w./w. of acetyl derivatives of $\beta$-hydroxyethyl-bis($\beta$-hydroxyoxypropyl)sulphonium acetate which may be converted to $\beta$-hydroxyethyl-bis($\beta$-hydroxypropyl)sulphonium chloride by treatment with hydrochloric acid and evaporation and water and acetic acid under reduced pressure.

*Example 16*

In place of the 40.7 parts of thiodiglycol and 14.7 parts of ethylene oxide used in Example 4 there may be used 50 parts of bis($\beta$-hydroxypropyl)sulphide and 20 parts of propylene oxide. The reaction product contains 40–45% w./w. of acetyl derivatives of tris($\beta$-hydroxypropyl)sulphonium acetate which may be converted to tris($\beta$-hydroxypropyl)sulphonium chloride by treatment with hydrochloric acid and evaporation of water and acetic acid under reduced pressure.

What we claim is:

1. A process for the manufacture of an inner sulphonium salt which comprises reacting at a temperature between −50° C. and 50° C., an organic sulphide $R_3$—S—$R_4$ with an alkylene oxide selected from the group consisting of ethylene oxide, propylene oxide and butylene oxide and an acid component selected from the group consisting of carbon dioxide, sulphur dioxide, sulphur trioxide, acetic anhydride, propionic anhydride, maleic anhydride, succinic anhydride, acetyl and propionyl bromides and chlorides, the substituents $R_3$ and $R_4$ being selected from the class consisting of alkyl, alkenyl containing from 2–3 carbon atoms, phenyl, naphthyl, and radicals of the formula $CHR_1CHR_2OH$ where $R_1$ and $R_2$ are selected from the class consisting of hydrogen and alkyl containing from 1 to 3 carbon atoms.

2. Process according to claim 1 wherein the reaction is carried out at temperatures within the range of $-15°$ C. to $5°$ C.

3. Process according to claim 2 wherein the reaction is carried out in the presence of an inert organic liquid diluent.

4. Process according to claim 1 wherein the organic sulphide $R_3$—S—$R_4$ is thiodiglycol.

5. Process according to claim 4 wherein the acid component is sulphur dioxide.

6. Process according to claim 1 wherein the acid component is acetyl chloride.

7. Process according to claim 1 wherein the acid component is sulphur trioxide.

8. Process according to claim 1 wherein the acid component is carbon dioxide.

9. Process according to claim 1 wherein the alkylene oxide is ethylene oxide; the sulphide is thiodiglycol; and the acid component is sulphur dioxide.

10. Process according to claim 1 wherein the alkylene oxide is ethylene oxide; the sulphide is thiodiglycol; and the acid component is acetic anhydride.

11. Process according to claim 3 wherein the diluent is a solvent selected from the group consisting of methyl chloroform, tetrachlorethane, carbon tetrachloride, perchlorethylene, trichlorofluoroethane and an excess of one of said reactants.

12. A process for the manufacture of an inner sulphonium salt which comprises reacting at a temperature between $-50°$ C. and $50°$ C., an organic sulphide of the formula $R_3$—S—$R_4$ with ethylene oxide and $SO_2$, the substituents $R_3$ and $R_4$ being selected from the class consisting of alkyl, alkenyl containing from 2–3 carbon atoms, phenyl, naphthyl, and radicals of the formula $$CHR_1CHR_2OH$$

wherein $R_1$ and $R_2$ are selected from the class consisting of hydrogen and alkyl containing from 1 to 3 carbon atoms.

References Cited by the Examiner

UNITED STATES PATENTS 2,813,898  11/57  Gaertner  260—505

FOREIGN PATENTS 943,830  6/56  Germany.

CHARLES B. PARKER, *Primary Examiner.*